(12) United States Patent
Trott et al.

(10) Patent No.: US 11,149,907 B2
(45) Date of Patent: Oct. 19, 2021

(54) METHOD FOR OPERATING AN INDUSTRIAL PLANT WITH AN ADSORPTION DEVICE AND INDUSTRIAL PLANT WITH AN ADSORPTION DEVICE

(71) Applicant: LINDE AKTIENGESELLSCHAFT, Munich (DE)

(72) Inventors: Thomas Trott, Munich (DE); Horn Christian, Munich (DE)

(73) Assignee: Linde Aktiengesellschaft, Munich (DE)

( * ) Notice: Subject to any disclaimer, the term of this patent is extended or adjusted under 35 U.S.C. 154(b) by 324 days.

(21) Appl. No.: 16/312,007

(22) PCT Filed: Jun. 21, 2017

(86) PCT No.: PCT/EP2017/025176
§ 371 (c)(1),
(2) Date: Dec. 20, 2018

(87) PCT Pub. No.: WO2017/220211
PCT Pub. Date: Dec. 28, 2017

(65) Prior Publication Data
US 2020/0309327 A1    Oct. 1, 2020

(30) Foreign Application Priority Data

Jun. 23, 2016 (EP) .................... 16001413

(51) Int. Cl.
*F17D 3/14* (2006.01)
*B01D 53/04* (2006.01)
*B01D 53/047* (2006.01)

(52) U.S. Cl.
CPC ........... *F17D 3/145* (2013.01); *B01D 53/047* (2013.01); *B01D 53/0462* (2013.01);
(Continued)

(58) Field of Classification Search
None
See application file for complete search history.

(56) References Cited

U.S. PATENT DOCUMENTS 5,730,783 A * 3/1998 Sanui ................ B01D 53/0462
                                                95/115

FOREIGN PATENT DOCUMENTS

EP    0757970 A1   2/1997
JP    H1190159 A   4/1999
(Continued)

OTHER PUBLICATIONS

International Search Report for PCT/EP2017/025176 dated Sep. 29, 2017.
(Continued)

*Primary Examiner* — Jason M Greene
(74) *Attorney, Agent, or Firm* — Millen, White, Zelano & Branig; Brion P. Heaney

(57) ABSTRACT

In a method for operating an adsorption device a laden gas stream is fed to an inlet of a sorption buffer device. In the device the laden gas stream passes through a sorbent for receiving a loading of sorbable substance along a sorption path from the inlet to an outlet. The sorbable substance passes from the gas stream to the sorbent, or vice versa, depending on the loading of the gas stream and the sorbent. During a phase of elevated loading, a region with an elevated loading of the sorbent extends from the inlet along the sorption path. During a phase of reduced loading, the region with the elevated loading of the sorbent is shifted in the direction toward the outlet. Length of the sorption path and quantity of the sorbent in the sorption buffer device are selected for accommodating at least three different regions of elevated loading.

23 Claims, 8 Drawing Sheets

(52) U.S. Cl.
CPC ...... *B01D 2256/16* (2013.01); *B01D 2256/20* (2013.01); *B01D 2256/22* (2013.01); *B01D 2256/24* (2013.01); *B01D 2257/80* (2013.01); *B01D 2259/40001* (2013.01)

(56) References Cited

FOREIGN PATENT DOCUMENTS

| | | | |
|---|---|---|---|
| JP | 2001172004 | A | 6/2001 |
| JP | 2013198845 | A | 10/2013 |
| JP | 2016000189 | A | 1/2016 |

OTHER PUBLICATIONS

English Abstract for JPH1190159, Publication Date: Apr. 6, 1999.
English Abstract for JP2001172004, Publication Date: Jun. 26, 2001.
English Abstract for JP2013198845, Publication Date: Oct. 3, 2013.
English Abstract for JP2016000189, Publication Date: Jan. 7, 2016.

* cited by examiner

METHOD FOR OPERATING AN INDUSTRIAL PLANT WITH AN ADSORPTION DEVICE AND INDUSTRIAL PLANT WITH AN ADSORPTION DEVICE

The invention relates to a method for operating an industrial plant having an adsorption device, and to an industrial plant having an adsorption device. Gases or gas mixtures can receive, transport and release again sorbable substances. A sorbable substance can, up to a certain quantity, be received by the gas mixture in dependence on thermodynamic parameters, in particular temperature and pressure. The quantity of the sorbable substance received by a gas mixture is often referred to as loading. During the industrial processing of such gas mixtures, it may be the case that the thermodynamic parameters vary greatly from one process step to a further process step. The result of this is generally that the gas mixture is present in a state of saturation or oversaturation with the sorbable substance. Condensation, for example, then occurs, wherein an excessive quantity of the sorbable substance is released by the gas stream and condenses at interfaces.

One example of this is the condensation in pipelines of moisture contained in process gases if said pipelines have a temperature which is below the dew point with respect to the laden gas stream. In such a case, the problem can occur that the condensed water causes corrosion of the pipeline.

Pressure-change adsorption installations and temperature-change adsorption installations, in particular, often have a loading of the process gas with a sorbable substance, which loading is very high in phases, up to saturation of the process gas with the substance. Then, even with a small change in temperature and/or pressure, condensation can occur.

DD 200 981 A1 discloses a method for dampening periodic variations in concentration in flowing media. Here, the medium is conducted through an apparatus which is filled with sorbent and in which the concentration of individual components of the medium, which concentration is above the average value, are sorbed, and thus retained, until, by way of inflowing medium with a different, for example lower, concentration of previously sorbed components, displacement desorption, and thus an approximately uniform release to the medium, is realized.

It is therefore an object of the present invention to provide an improved method for the temporal homogenization of a loading of a gas mixture with a sorbable substance in an industrial plant.

Said object is achieved according to a first aspect by a method for operating an industrial plant. The industrial plant has an adsorption device which emits a gas stream laden with a sorbable substance with a predefined mass flow rate, wherein phases of reduced loading and phases of elevated loading, which follow one another in a temporally alternating manner, are involved for the laden gas stream. The method comprises the steps of:
- feeding of the laden gas stream to an inlet of a sorption buffer device;
- conducting of the laden gas stream in the sorption buffer device through a sorbent, which is suitable with for receiving a loading of the sorbable substance, along a sorption path, which leads from the inlet to an outlet of the sorption buffer device, wherein the sorbable substance passes from the gas stream to the sorbent, or from the sorbent to the gas stream, in dependence on the loading of the gas stream and the loading of the sorbent; and
- tapping off of a treated gas stream at the outlet of the sorption buffer device. During a phase of elevated loading of the gas stream with the sorbable substance, a region with an elevated loading of the sorbent with the sorbable substance, which region extends from the inlet of the sorption buffer device along the sorption path, is formed. During a subsequent phase of reduced loading of the gas stream, the region with the elevated loading of the sorbent is shifted along the sorption path in the direction toward the outlet of the sorption buffer device. Here, a length of the sorption path and a quantity of the sorbent in the sorption buffer device are selected in such a way that the sorption buffer device is set up for accommodating at least three, preferably at least four, more preferably at least five, different regions of elevated loading of the sorbent along the sorption path during the operation of the industrial plant.

In embodiments, a region of reduced loading is spatially situated between two regions of elevated loading. It is preferably ensured that the sorbent in the sorbent buffer device is never completely laden.

Such a method makes it possible for a treated gas stream to be able to be provided, the loading of which does not exceed a predfinable upper limit value. The upper limit value may in particular depend on process steps in which the treated gas stream is processed.

This may for example be an introduction of the treated gas stream into a gas pipeline which is operated at ambient temperatures.

In the present case, a gas stream is to be understood as meaning a flow of a mixture or fluid, which is present in a gaseous state. Such a fluid may have differing compositions. For example, the mixture may comprise hydrogen ($H_2$), carbon monoxide (CO), carbon dioxide ($CO_2$), methane ($CH_4$), volatile organic compounds, nitrogen ($N_2$), oxygen ($O_2$) and/or a noble gas. The composition of the gas stream may be subjected to temporal variations. A gas stream may be considered to be a stream of individual gas volumes. In particular, in the following text, an individual gas volume from the gas stream will be used as an exemplary volume in order to explain state changes.

Such a gas volume may be characterized for example by state variables such as pressure, temperature, number of particles and composition. In the present case, bar is used as the unit for pressure, where 1 bar≈1.025 hPa. The temperature is indicated in ° C. A number of particles may be indicated for example in absolute terms by mole (defined by the Avogrado constant, 1 mole≈6.022 $10^{23}$ particles) or else in relative terms on the basis of a basic quantity, for example ppm (parts per million). The composition may be indicated on the basis of a volume, a mass or a number of particles.

The gas stream also has, as a state variable, a flow speed. The flow speed may be indicated for example as a mass flow rate. A mass flow rate may be indicated in standard cubic meters/unit time, for example standard $m^3/h$. A standard cubic meter comprises that quantity of a gas mixture which is contained in a volume of one cubic meter of the gas mixture under standard conditions. Standard conditions are for example a standard pressure of $pn=1.01325$ bar and a standard temperature of $Tn=0°$ C.

If, below, the composition of the gas stream is referred to, this is intended to mean that the gas stream has the indicated composition for a period of time. In other words, the gas stream carries along a number of gas volumes which have the indicated composition.

One possible composition of the gas stream is for example 70% $H_2$, 20% $CH_4$ and 10% CO, based on the volume. Differences in the composition in the % range or else other constituents, for example referred to as trace gases, may be present. The laden gas stream also has a loading with a sorbable substance. Water and organic compounds, in particular, are sorbable substances and may constitute a loading of the gas stream.

Sorption comprises in particular the processes of adsorption, absorption and desorption. Adsorption refers to the accumulation of particles, for example present in a gas mixture, of a sorbable substance at an interface with another medium, such as for example on a solid body like a pipe. Absorption refers to the receiving of the particles in another medium, such as for example dissolving of $CO_2$ in liquid water. Desorption refers to the reverse process. This is for example a transfer of the particle from the adsorbed state into the gas phase.

The loading of a gas stream may be indicated for example relative to the particles contained in a gas volume. A gas volume has a maximum loading in dependence on its state. If the gas volume is laden with a substance to the maximum extent, then it is also referred to as being saturated with respect to the sorbable substance. The present loading may be indicated relative to the maximum loading. This may also be referred to as relative content. A dew point temperature can be defined at constant pressure and predefined loading. The dew point temperature, also simply referred to as the dew point, is the temperature at which the relative content of the sorbable substance in the gas volume is 100%. If the temperature drops below the dew point temperature, then dew is formed, that is to say the sorbable substance condenses on condensation nuclei and/or surfaces of elements of the industrial plant, which are in contact with the gas volume.

It may in particular be the case that a surface has a temperature which is below the dew point of the gas volume with respect to a sorbable substance. The gas volume, or at least a part of the gas volume, is then cooled in such a way that condensation of the sorbable substance on the surface can occur. If the sorbable substance is water and the gas volume contains a fraction of $CO_2$, then it may be the case that condensed (liquid) water absorbs $CO_2$ from the gas volume, this leading to a reduction in the pH value of the water. Such acidic water may constitute a cause of corrosion of metal lines.

Water contained in a gas volume may also be referred to as water vapor, moisture or humidity. For water, for example, the relative content is referred to as relative humidity. At a relative humidity of 0%, the gas volume may be referred to as being dry, at a relative humidity of 100%, said volume may be referred to as being saturated, and at a relative humidity between these two extremes, the gas volume may also be referred to as being moist.

In the following text, it may simply be assumed without loss of generality that water is the sorbable substance, and consequently reference may be made to moisture or humidity or relative humidity.

The adsorption device may in particular comprise a pressure-change adsorption device and/or a temperature-change adsorption device. Such devices have for example multiple operating phases, in particular an adsorption phase and a regeneration phase. In such devices, a moist gas stream can be dried during the adorption phase, wherein the loading of the gas stream with moisture is reduced. The laden gas stream emitted by such an adsorption device thus has a reduced loading with moisture during this phase. In particular, the emitted laden gas stream can even be dry during this phase. During the regeneration phase, such an adsorption device can be regenerated, wherein the adsorption device emits a laden gas stream with an elevated loading of moisture. In particular, the emitted laden gas stream can be saturated during this phase.

Such adsorption devices may be operated for example in a periodic manner or else in an alternating manner with phases of temporally different length, which may be referred to as intervals. An interval length may comprise for example a few minutes or else a few hours up to days.

Advantageously, the mass flow rate of the gas stream is constant at least in phases, this simplifying continuous operation of a plant.

Feeding of the laden gas stream to the sorption buffer device may involve a direct connection of an outlet of the adsorption device to the inlet of the sorption buffer device, for example by way of a suitable pipeline. Alternatively, process steps may be provided, such as for example compression of the laden gas stream with the aid of a compressor, and cooling of the laden gas stream and/or of the compressed gas stream in a gas-cooling device. In these cases, the compressed and/or cooled laden gas stream is fed to the inlet of the sorption buffer device.

The sorption buffer device comprises in particular a container which is provided with an inlet and an outlet and which is suitable for accommodating a quantity of the sorbent. Furthermore, the container may be set up to withstand an elevated gas pressure, such as for example at least 20 bar, preferably at least 30 bar.

The container comprises a volume. For example, the container may have the shape of a cylinder, wherein then a diameter and a length of the container define the volume. At least one part of the volume of the container can be filled with the sorbent. The quantity of the sorbent is limited to a maximum value by said part of the volume.

A sorbent is in particular a porous medium which is suitable for being loaded with a sorbable substance. Loading of the sorbent with the sorbable substance occurs in particular by adsorption or absorption of the sorbable substance. The extent of the adsorption or absorption depends both on the loading of the gas stream and on the loading of the sorbent, and also on the state variables of pressure and temperature. In particular, desorption can also take place. The direction of sorption of a particle depends in particular on the ratio of the loading of the sorbent to the loading of the gas stream. Here, the direction of sorption is to be understood as meaning sorption from the gas stream to the sorbent or vice versa.

A transfer can only take place if the gas stream is in close contact with the sorbent. This is achieved in particular by means of throughflow.

Sorbents comprise for example activated carbon, activated coke, carbon molecular sieves, further carbon-containing adsorbents, activated alumina, silica gels, zeolites, trass, further oxidic adsorbents, polymer adsorbents, organometallic adsorbents and/or mixtures thereof.

A gas stream fed to the inlet of the container enters the interior of the container, which is filled with a quantity of the sorbent. Owing to the porosity of the sorbent, the gas stream is able to flow through the sorbent along the sorption path. A gas volume carried along by the gas stream thus flows along the sorption path in the direction toward the outlet of the container. During the throughflow, the gas volume comes into close contact with sorbent arranged in different sections of the sorption path, wherein in each section, transfers, as described above, of a loading from the gas stream to the sorbent and vice versa can take place. In particular, such a transfer can take place multiple times and in in each case different directions and/or at different locations along the sorption path.

This is described by way of example below on the basis of a gas volume carried along by the gas stream. Prior to entering the container filled with the sorbent, the gas volume is characterized by its state variables. In particular, it has a loading. For example, it is saturated with moisture. In the example, the sorbent has a region with elevated loading, which region is situated for example in a central section of the sorption path. The remaining sorbent is dry. If the saturated gas volume enters the container and flows through the sorbent along the sorption path, then it firstly impinges on a section with dry sorbent. Therefore, it is in particular possible for a sorption of the moisture from the gas volume to the sorbent to take place. In this way, the humidity of the gas volume is reduced and the loading of the sorbent in the section is increased, wherein a region with elevated loading of the sorbent is formed in this section.

The gas volume flows along the sorption path through the sorbent and is further dried until it reaches the region with elevated loading of the sorbent. In the example, the gas volume then has a very low humidity, and for this reason it is in particular possible for sorption of the moisture from the sorbent to the gas volume to take place. In this way, the loading of the sorbent is reduced and the humidity of the gas volume increases.

The then moist gas volume flows further along the sorption path. It exits the section with elevated loading of the sorbent and flows through a further section in which the sorbent is present in a dry state. It is therefore possible for sorption from the gas volume to the sorbent to take place again, whereby the humidity of the gas volume is reduced and the loading of the sorbent in the section is increased. The gas volume then reaches the outlet of the container and exits the container with reduced humidity. Consequently, in this example, a gas volume which, upstream of the sorption buffer device, was present in a state of saturation with moisture has been transformed into a gas volume with reduced humidity downstream of the sorption buffer device. Furthermore, a region with elevated loading, which is arranged at the inlet of the container and extends with a certain width in the direction toward the outlet along the sorption path, has formed in the sorbent. Also, a region with elevated loading of the sorbent has been shifted from a central section of the sorption path to a further section along the sorption path in the direction toward the outlet. A width of the regions of elevated loading of the sorption depends on the quantity of the sorbable material in a respective region and on the receiving capacity of the sorbent.

If then a phase with a reduced loading of the gas stream follows, that is to say gas volumes with a reduced loading flow through the sorption buffer device, then that region of elevated loading of the sorption device which is arranged at the inlet of the container is shifted along the sorption path to a section of the sorption path in which the sorbent has, at the start of said phase, a reduced loading. Furthermore, the gas volume, which after flowing through the sorbent arranged in the central section, which sorbent initially has a reduced loading, will have a reduced loading. Therefore, when it reaches the adjoining section, the gas volume can receive moisture. The sorbent arranged in the adjoining section has a region with elevated loading, which formed in the preceding phase. The gas volume receives a part of the moisture, as a result of which its humidity increases. The gas volume then exits the container. Consequently, during this phase, a shift of the regions of elevated loading within the sorbent has taken place. The gas stream, initially laden with a reduced loading, has been transformed into a treated gas stream with a higher loading.

In particular, the quantity of the sorbent and the length of the sorption path in the sorption buffer device are selected in such a way that, during both phases, the loading of the treated gas stream does not exceed the predefined limit value. During the phase of elevated loading of the laden gas stream, the loading of the treated gas stream, which is reduced relative thereto, is lower than the limit value. During the phase of reduced loading of the laden gas stream, the loading of the treated gas stream, which is elevated relative thereto, is lower than the limit value. The loading of the treated gas stream does not therefore have to be constant over time, but can differ from phase to phase. Averaged over time, wherein an averaging period covers at least some phases of elevated and reduced phases, the loading of the laden gas stream and the loading of the treated gas stream are equal.

A loading front may be defined, which indicates the loading of the sorbent in the container along the sorption path. The loading front can be represented for example in a diagram, wherein one axis indicates a position along the sorption path and a further axis indicates the loading of the sorbent at the corresponding position. Such a diagram allows a comprehensible representation of the functioning of the sorption buffer device, in particular if the loading front is represented at different times.

As described in the example, during a first phase, a region with elevated loading is formed in the sorbent in dependence on the loading of the laden gas stream, which region extends with a certain width toward the outlet of the container from the inlet of the container along the sorption path. Here, the width of said region may depend on the total quantity of the sorbable substance introduced during the phase of elevated loading. The quantity can be calculated for example from the duration of the phase, the mass flow rate and the loading of the gas stream. During a phase, following this phase, with reduced loading of the laden gas stream, the region with elevated loading in the sorbent is shifted along the sorption path in the direction toward the outlet. This occurs by multiple transfer of the sorbable substance, as described in the example described further above. It may also be said that the loading front has traveled along the sorption path. The distance covered by the loading front during a phase of reduced loading may depend in particular on the duration of the phase of reduced loading of the laden gas stream, the mass flow rate and the loading. During a periodic sequence of these two phases, and if the mass flow rate and the loading in different phases of elevated loading are equal, or at least similar, to one another, and the mass flow rate and the loading in different phases of reduced loading of the laden gas stream are equal, or at least similar, to one another, a loading front may be formed in which a distance between two regions with elevated loading of the sorbent is in each case constant. Accordingly, the loading front is able to be described by a function with relative maxima and/or minima, which are spaced apart in a periodic manner.

Tapping off of the treated gas stream at the outlet of the sorption buffer device may comprise for example introduction of the gas stream into a pipeline connected at the outlet, in particular a gas pipeline. A gas pipeline is to be understood as meaning an arrangement which is set up for transporting the gas stream over a predefined distance, for example 10 km or else 20 km. The gas pipeline may be formed from pipes for example. In particular, the gas pipeline can be operated at ambient temperature.

According to one embodiment of the method, the latter comprises the steps of: expansion of the treated gas stream with the aid of a pressure reducer arranged in the outflow direction with respect to the sorption buffer device, wherein an expanded gas stream is produced; and feeding of the expanded gas stream to a gas pipeline arranged downstream of the sorption buffer device.

Such a pressure reduction is particularly advantageous since it is consequently possible to realize a dew point reduction. A pressure reducer may also be referred to as a pressure-reducing valve, reducing valve or pressure valve. The pressure reducer is set up in particular for establishing a predefinable pressure difference between the inflow side and the outflow side. Alternatively, the pressure reducer may be set up such that a predefinable maximum pressure on the outflow side is not exceeded or a predefinable minimum pressure on the outflow side is not fallen below.

According to a further embodiment of the method, a gas pressure difference between the sorption buffer device and the gas pipeline is 5 bar-10 bar.

For example, a gas pressure at the outlet of the container of the sorption buffer device may be 23 bar, and a gas pressure in a gas pipeline arranged downstream may be 17 bar. The gas stream then expands by the pressure difference of 6 bar.

According to a further embodiment of the method, the latter comprises the step of: cooling of the laden gas stream with the aid of a gas-cooling device arranged upstream of the sorption buffer device, wherein a cooled gas stream is produced.

The cooling of the gas stream allows a relative content of a sorbed substance to be increased. If prior to the cooling the gas stream was already present in a saturated or nearly saturated state, this can lead in particular to condensation and thus separation of the sorbed substance in the gas-cooling device. This can be advantageous and desirable in order to reduce the absolute loading of the gas stream. In particular if the treated gas stream is fed to a gas pipeline operated at ambient temperatures and the ambient temperatures are low, such as for example in winter, this step may contribute to a predefinable limit value not being exceeded by the loading of the treated gas stream. The gas-cooling device may also be referred to as a cooler or a separator.

According to a further embodiment of the method, a gas temperature of the cooled gas stream is 20° C.-50° C.

According to a further embodiment of the method, the latter comprises the step of: compression of the laden gas stream with the aid of a compressor, wherein a gas stream subjected to a pressure is produced.

This makes it possible to build up an advantageous process pressure. In particular, it can be ensured in this way that, for example by means of a pressure reducer arranged on the outflow side with respect to the sorption buffer device, a pressure difference can be realized. It can also be ensured that a mass flow rate is maintained because the gas flow requires energy owing to friction losses. This is evident in particular from a decrease in pressure along a flow. In particular, it is thus possible to ensure the flow through the sorption buffer device and the flow through an optional gas pipeline.

It is also possible in this way to realize a situation in which the pressure in the sorption buffer device is constant over time and does not depend on further processes.

According to a further embodiment of the method, a gas pressure of the gas stream subjected to the pressure is 20 bar-30 bar.

According to a further embodiment of the method, the adsorption device comprises a pressure-change adsorption device and/or a temperature-change adsorption device.

Such adsorption devices may in particular be operated in a periodic manner. The intervals of the phases of elevated loading and phases of reduced loading are then always of equal length. Furthermore, a loading of the laden gas stream during the respective phases can in each case be equal or at least similar. In this case, a periodic loading front as described above, whose periods correspond to the interval lengths, is formed.

According to a further embodiment of the method, the gas stream comprises gaseous hydrogen, gaseous carbon monoxide, gaseous carbon dioxide, gaseous organic compounds, gaseous water, gaseous nitrogen, gaseous oxygen and/or a gaseous noble gas, or combinations of these.

Gaseous organic compounds in particular have an empirical formula like $C_nH_{2n+2}$. Such sorbable substances are also referred to as volatile organic compounds or VOCs.

According to another embodiment of the method, the laden gas stream has a water quantity of 0-4000 ppm by mole, and the treated gas stream has a water quantity of 500-2000 ppm by mole, preferably 750-1500 ppm by mole.

Consequently, homogenization of the loading of the gas stream is advantageously achieved. For example, the humidity of the laden gas stream during a phase of elevated loading amounts to 4000 ppm, and the humidity of the treated gas stream during said phase amounts to 1500 ppm. During the phase of reduced loading, the humidity of the laden gas stream amounts to, for example, 0 ppm, and the humidity of the treated gas stream amounts to 750 ppm.

According to a further embodiment of the method, the phase of elevated loading lasts for 2-10 h, and the phase of reduced loading lasts at least twice as long, preferably at least three times as long, as the phase of elevated loading.

This preferably makes it possible to use the method also for processes with long intervals.

According to a further embodiment of the method, a mass flow rate of the gas stream lies between 500 standard $m^3/h$ and 20 000 standard $m^3/h$, preferably between 8000 standard $m^3/h$ and 17 000 standard $m^3/h$.

This advantageously makes it possible to use the method for industrial plants of different size. The method may also be used with gas streams which vary with time.

Further advantages of the method or of embodiments of the method are stated below.

The sorption buffer device does not require its own energy source. Its use leads solely to a decrease in pressure of the gas stream.

Furthermore, it may be possible for use to be made of the treated gas stream, which has a homogenized loading, in processes in which the loading of the laden gas stream is, at least in phases, too high. This can lead to a more efficient use of the industrial plant and to a saving of raw materials and energy.

It is also possible for homogenization of the loading of the gas stream to be achieved without the sorbable substance accumulating as waste product, which for example allows energy costs to be saved. In addition, the sorption buffer device is set up for permanently continuous operation.

Moreover, such a sorption buffer device can have a very simple construction, and for this reason it can be convenient to produce and can require only little maintenance effort.

Furthermore, it is possible to apply this method even in industrial processes having very long intervals, since a sufficient quantity of the sorbent and a sufficiently long sorption path are always provided.

Proposed according to a second aspect is an industrial plant for implementing the method according to the first aspect or to one of the embodiments of the first aspect. The industrial plant has a sorption buffer device for treating a gas stream laden with a sorbable substance. A length of a sorption path and a quantity of a sorbent in the sorption buffer device are set up in such a way that the sorption buffer device is suitable for accommodating at least three, preferably at least four, more preferably at least five, different regions of elevated loading of the sorbent along the sorption path during the operation of the industrial plant.

According to an embodiment of the industrial plant, the latter is furthermore set up for treating the laden gas stream in such a way that the treated gas stream has a reduced loading in relation to the elevated loading of the laden gas stream and the treated gas stream has an elevated loading in relation to the reduced loading of the laden gas stream.

According to a third aspect, a method for producing a sorption buffer device for treating a gas stream is proposed. The sorption buffer device is suitable in particular for installation in the industrial plant according to the second aspect and for operation in an industrial plant according to the method of the first aspect or of one of the embodiments of the method. The proposed sorption buffer device has a container which is filled with a sorbent and which has an inlet and an outlet such that a gas stream fed to the inlet flows through the sorbent along a sorbent path. The sorption path leads from the inlet to outlet in the container. A length of the sorption path and a quantity of the sorbent in the sorption buffer device are selected in such a way that the sorption buffer device is suitable for accommodating at least three, preferably at least four, more preferably at least five, different regions of elevated loading of the sorbent along the sorption path during the operation of the industrial plant.

Further possible implementations of the method also comprise combinations not explicitly specified of features or embodiments described above or below with regard to the exemplary embodiments. A person skilled in the art will also add individual aspects as improvements or supplementations to the respective basic form of the method.

The embodiments stated for the method apply correspondingly to the industrial plant and to the method for its production.

BRIEF DESCRIPTION OF THE DRAWINGS

Further advantageous configurations and aspects of the method form the subject matter of the dependent claims and of the exemplary embodiments of the method described below. The method will be explained in more detail hereinafter on the basis of preferred exemplary embodiments with reference to the appended figures, in which:

FIG. 1 shows a P & I diagram of a first exemplary embodiment of an industrial plant 100 which is suitable for the implementation of the method. In the exemplary embodiment in FIG. 1, the industrial plant 100 comprises an adsorption device 10 and a sorption buffer device 40. During a phase P1 (see FIG. 2), the adsorption device 10 of the exemplary embodiment emits for approximately 18 h a laden gas stream $G_1$, the loading of which is reduced. During a phase P2 which follows, said adsorption device emits for approximately 6 h a laden gas stream $G_1$, which is laden with 1200-4000 ppm of water. The laden gas stream $G_1$ comprises 70% $H_2$, 10% CO and 20% $CH_4$, based on the volume, and flows at a mass flow rate of 8000-17 000 standard m³/h.

Figure 1:
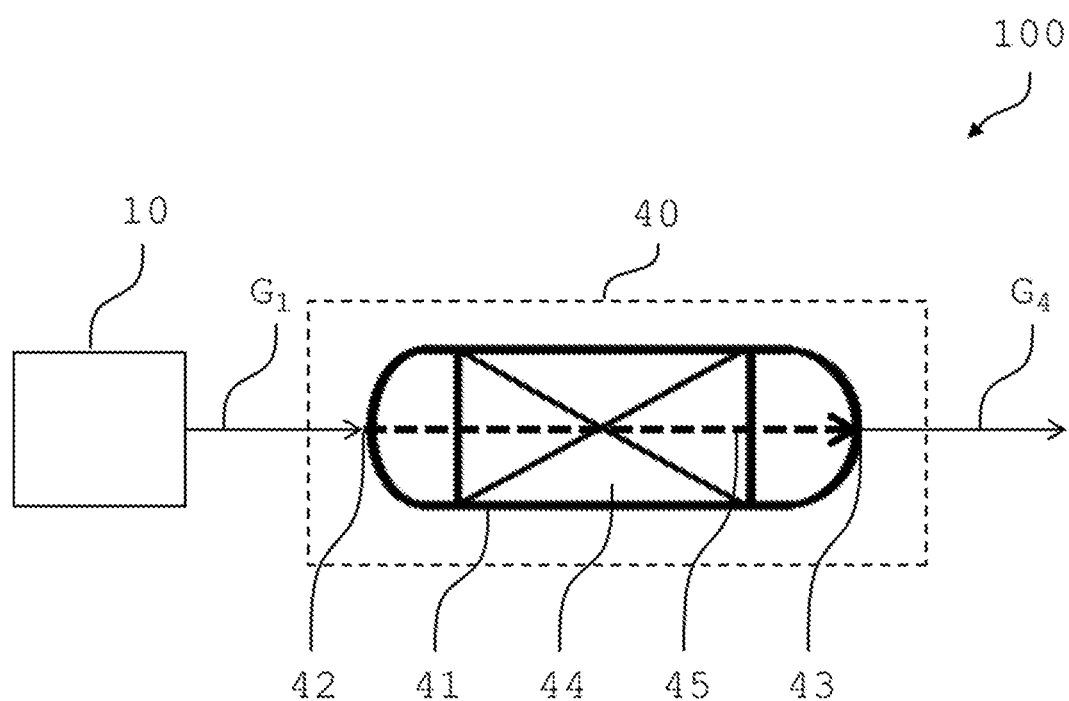
FIG. 1 shows a P & I diagram (piping and instrumentation diagram) of a first exemplary embodiment of an industrial plant which is suitable for the implementation of the method.

The laden gas stream G1 is fed to the sorption buffer device 40. The latter has a container 41 which is laden with a sorbent 44 and which has an inlet 42 and an outlet 43. The container 41 is filled with the sorbent 44, through which sorbent a gas stream is able to flow on a sorption path 45. The container 41 of the exemplary embodiment has the shape of a cylinder, with an inner diameter of 2.2 m and a height of 7.5 m, and is filled with approximately 22 t of silica gel as the sorbent 44. The laden gas stream G1 enters via the inlet 42 the interior, filled with the sorbent 44, of the container 41 and flows through the latter along the sorption path 45, said path leading from the inlet 42 to the outlet 43. Here, the loading of the gas stream G1 is made more homogeneous in such a way that the treated gas stream G4 has a loading of 750 ppm 1500 ppm and a dew point reduction by 10° C.-15° C. is achieved.

Figure 2:
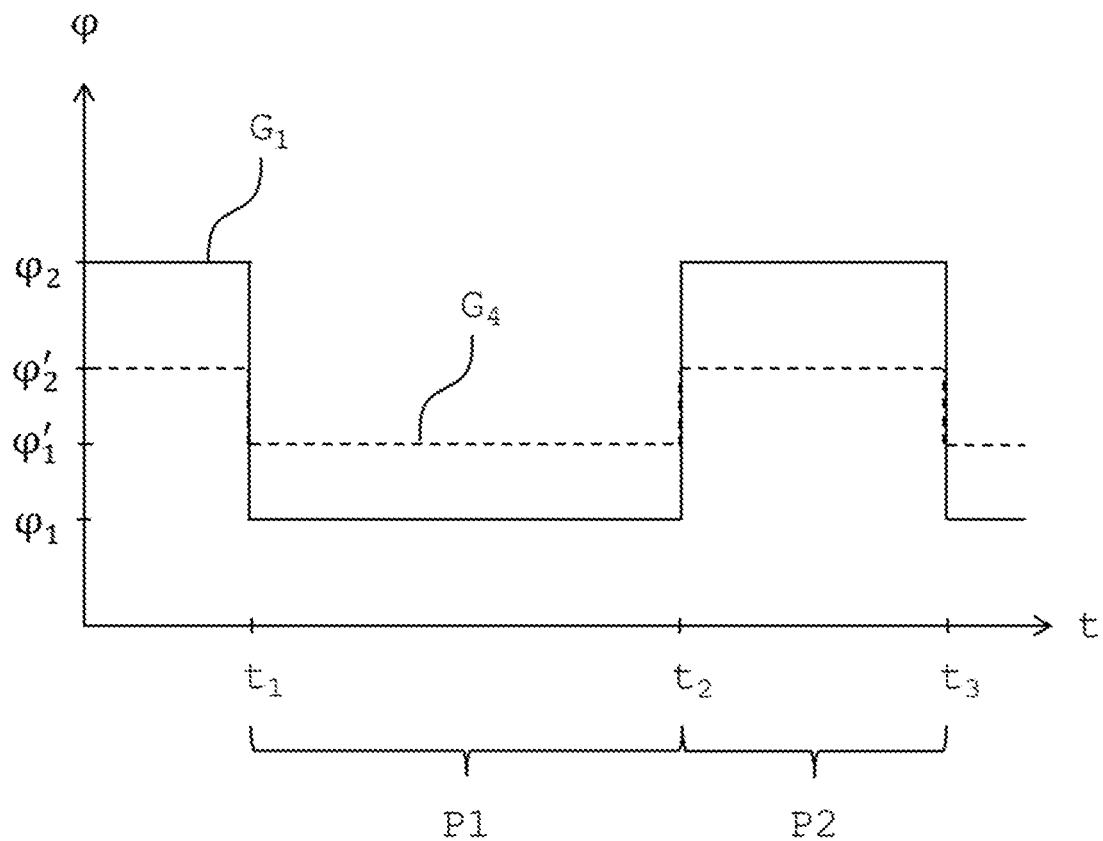
FIG. 2 shows one example of a profile over time of a loading of a laden gas stream and of a treated gas stream.

FIG. 2 shows one example of a profile over time of a loading φ of a laden gas stream $G_1$ and of a treated gas stream $G_4$, which can occur for example in an industrial plant 100 according to the exemplary embodiment in FIG. 1. It is a diagram with a time axis t and a loading axis φ depicted. A first phase P1, during which the laden gas stream $G_1$ has a reduced loading $φ_1$, starts at a time $t_1$. The phase P1 ends at a time $t_2$, at which the loading φ of the laden gas stream $G_1$ increases to an elevated loading $φ_2$, which persists for the duration of the phase P2 until the time $t_3$. The diagram shows only a small detail comprising a phase P1 with reduced loading $φ_1$ and a phase P2 with elevated loading $φ_2$. As indicated, this time period is preceded by further phases and is followed by further phases. Here, the duration of individual phases and the loading φ of a gas stream may differ from the example shown. Moreover, between the two phases, it is also possible for a gradual change in the loading φ of a gas stream to occur.

Shown additionally in the diagram in FIG. 2 is one example of a profile of a loading φ of the treated gas stream $G_4$ (dashed line). During the phase P1, when the laden gas stream $G_1$ has a reduced loading $φ_1$, the treated gas stream $G_4$ has a loading $φ'_1$ which is elevated in relation to the reduced loading $φ_1$. During the phase P2, when the laden gas stream $G_1$ has an elevated loading $φ_2$, the treated gas stream $G_4$ has a loading $φ'_2$ which is reduced in relation to the elevated loading $φ_2$. Thus, overall, homogenization of the loading φ of the gas stream is achieved, this being reflected by a reduced difference of the elevated loading $\varphi_2, \varphi'_2$ and the reduced loading $\varphi_1, \varphi'_1$.

In particular, it is possible that the treated gas stream $G_4$ has a loading φ' which tends to a reduced loading $\varphi'_1$ slowly, for example in an exponentially decreasing manner, during a phase P1 of reduced loading $\varphi_1$ of the laden gas stream $G_1$. Also, it may in particular be the case that, from the value of reduced loading $\varphi'_1$, the loading φ' of the treated gas stream $G_4$ tends to an elevated loading $\varphi'_2$ of the treated gas stream $G_4$ slowly, for example in an exponential manner, during a phase P2 with elevated loading $\varphi_2$ of the laden gas stream $G_1$.

Figure 3:
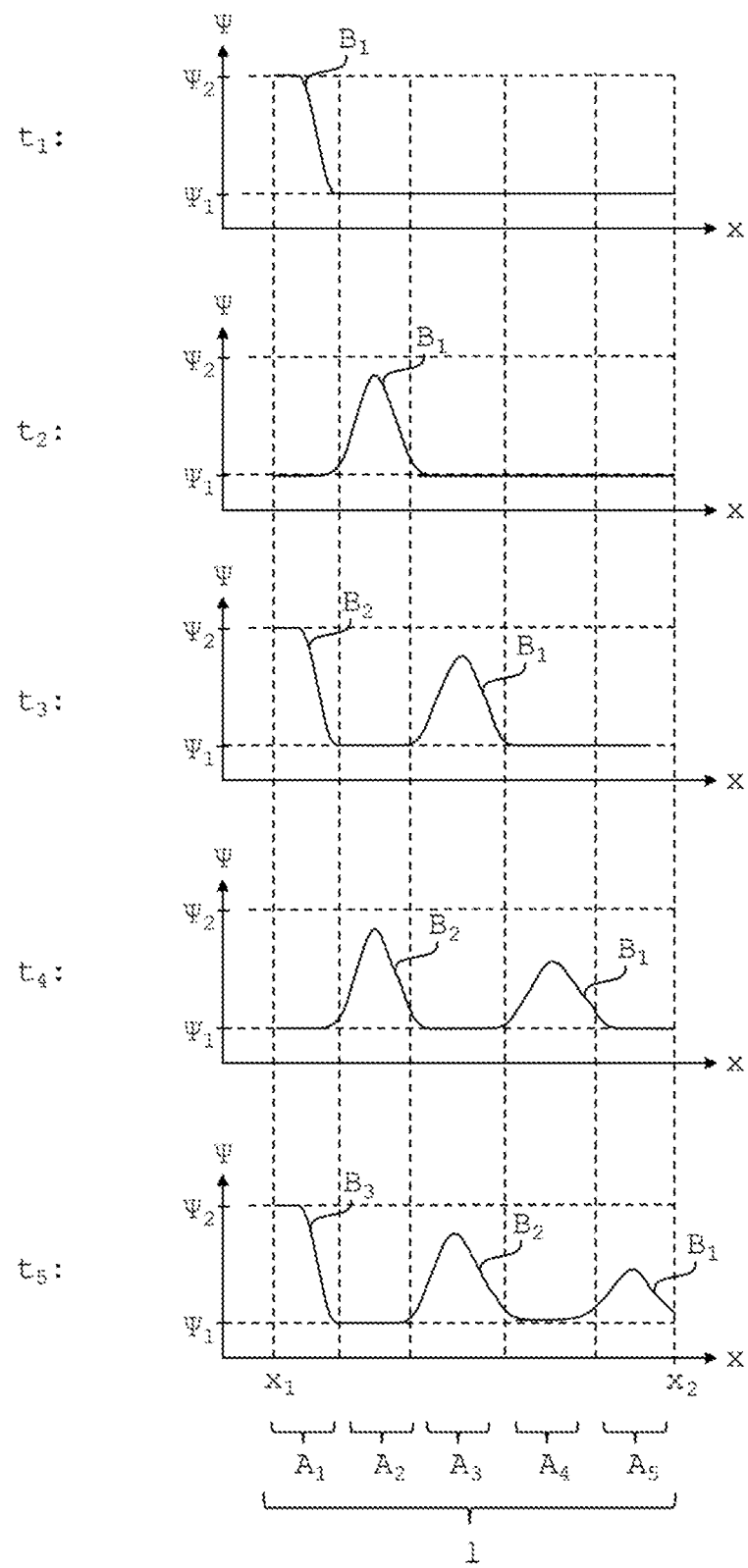
FIG. 3 shows a number of diagrams of one example of a loading of a sorbent in the sorption buffer device with a sorbable substance at different times.

FIG. 3 shows a number of diagrams of one example of a loading $\psi_1$ of a sorbent 44 with the sorbable substance in the sorption buffer device 40 along the length $l=x_2-x_1$ of the sorption path 45 at different times $t_1$-$t_5$. The diagrams are aligned with one another, and points on the x-axis arranged above one another correspond, this being illustrated by the through-going dashed lines. For reasons of clarity, the labeling of the x-axis can be found only under the diagram $t_5$. Where the gas stream G is referred to below, this is intended to mean the gas stream in the sorption buffer device.

Figure 8:
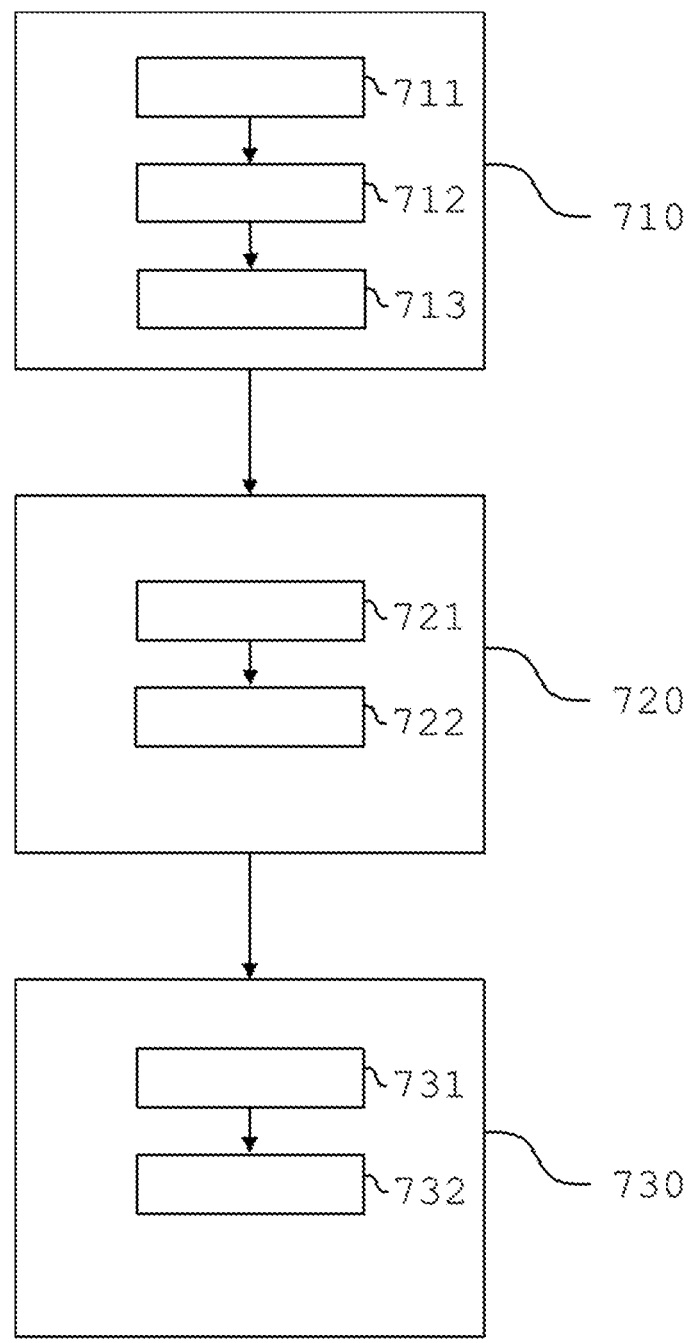

FIG. 8 illustrates a block diagram of a further exemplary embodiment of a method for operating an industrial plant.

The first time is $t_1$ and may coincide with the time $t_1$ in FIG. 2. At this time $t_1$, a phase P2 with an elevated loading $\varphi_2$ of the gas stream $G_1$ has just finished. During this phase P2, a region $B_1$ with elevated loading ψ of the sorbent 44 has been formed in the section $A_1$ of the sorption path 45. Said region $B_1$ has a width which depends in particular on the duration of the phase P2, the mass flow rate and the loading $\varphi_2$ of the laden gas stream $G_1$ (see FIG. 2). A phase P1 with a reduced loading $\varphi_1$ of the laden gas stream $G_1$ follows at the time $t_1$ and lasts until a time $t_2$, as is illustrated for example in FIG. 2.

The second time $t_2$ may coincide for example with the time $t_2$ in FIG. 2. As is illustrated in the diagram $t_2$, the region $B_1$ of elevated loading ψ of the sorbent 44 has been shifted from the section $A_1$ to the section $A_2$ of the sorption path 45 in the direction toward the outlet $x_2$. This can be explained as follows: During the phase P1, the laden gas stream $G_1$ has a reduced loading $\varphi_1$, and for this reason a transfer of the sorbable substance from the sorbent 45, which is present with elevated loading ψ, in the section $A_1$ to the gas stream G is possible, by which the loading ψ of the sorbent 45 in the section $A_1$ is reduced. Therefore, after flowing through the section $A_1$, the gas stream G can have a loading φ which is greater than the reduced loading $\varphi_1$. When the gas stream G has flowed through the region $A_1$, it flows along the sorption path 45 through the region $A_2$, in which the sorbent 44 initially has a reduced loading ψ (according to the illustration of the diagram $t_1$). A transfer of the sorbable substance from the gas stream G to the sorbent 44 can therefore take place in the region $A_2$. Consequently, the region $B_1$ of elevated loading of the sorbent 44 is shifted along the sorption path 45 to section $A_2$. It may also be said that the loading front in the sorbent 45 is shifted.

The third time $t_3$ corresponds to a time after the time $t_2$, when a further phase P2 has just finished. A further region $B_2$ with an elevated loading of the sorbent 44 has therefore been formed in the section $A_1$, and the region $B_1$ of elevated loading ψ has been shifted along the sorption path 45 from the section $A_2$ to the section $A_3$.

The fourth time $t_4$ corresponds to a time after the time $t_3$, when a further phase P1 has just finished. The two regions $B_1$, $B_2$ with elevated loading ψ of the sorbent 44 have therefore been shifted along the sorption path 45 to the in each case nearest section, $A_2$ and $A_4$ respectively.

The fifth illustrated time $t_5$ corresponds to a time after the time $t_4$, when a further phase P2 has just finished, and for this reason a third region $B_3$ of elevated loading ψ of the sorbent 44 has been formed in the section $A_1$. The two further regions $B_1$, $B_2$ with elevated loading ψ of the sorbent 44 have again been shifted along the sorption path 45 to the in each case nearest section, $A_3$ and $A_5$ respectively.

In the illustrated time course with snapshots of the loading front in the sorbent 44, the sorption buffer device 40 is suitable for accommodating three different regions $B_1$, $B_2$, $B_3$ with an elevated loading ψ of the sorbent 44. Between said regions $B_1$, $B_2$, $B_3$, there are in each case regions with a reduced loading ψ of the sorbent 44.

A further effect is illustrated in FIG. 3. The relative loading ψ of the sorbent 44 in a region $B_1$, $B_2$, $B_3$ decreases when the region passes through the sorbent 44 along the sorption path 45. In FIG. 3, this is illustrated by the height of the loading ψ of a region $B_1$, $B_2$, $B_3$ at different times $t_1$-$t_5$. At the same time, a respective region $B_1$, $B_2$, $B_3$ widens, since the total quantity of the sorbable substance is maintained.

Figure 4:
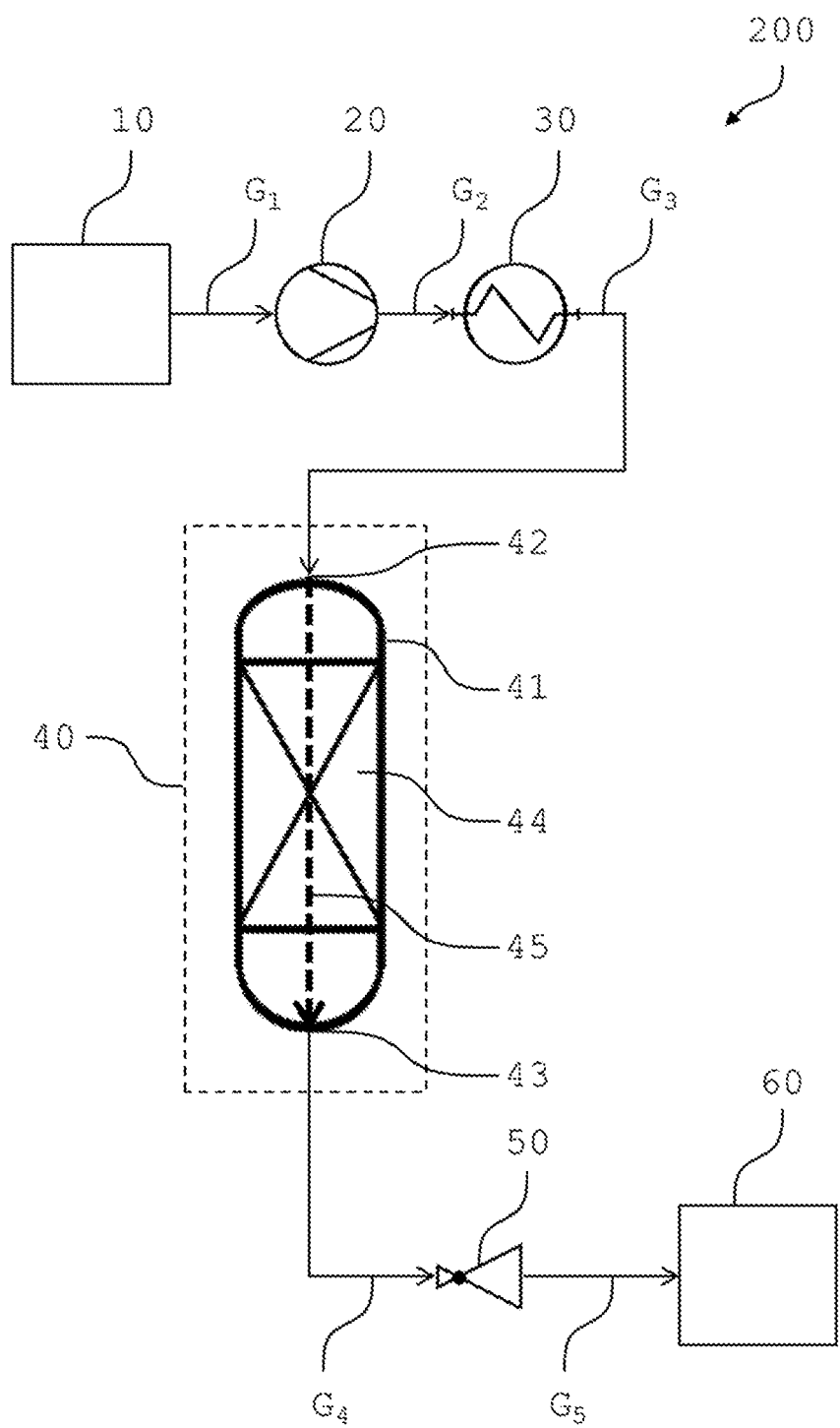
FIG. 4 shows a P & I diagram of a second exemplary embodiment of an industrial plant which is suitable for the implementation of the method.

FIG. 4 shows a P & I diagram of a second exemplary embodiment of an industrial plant 200 which is suitable for the implementation of the method. In the exemplary embodiment in FIG. 4, the industrial plant 200 comprises an adsorption device 10, a compressor 20, a gas-cooling device 30, a sorption buffer device 40, a pressure reducer 50 and a gas pipeline 60.

The laden gas stream $G_1$ coming from the adsorption device 10 is fed to the compressor 20 and compressed. For example, the pressure of the compressed gas stream $G_2$ is 25 bar. The gas stream $G_2$ subjected to pressure in this manner is fed to the gas-cooling device 30 and, there, is cooled to a gas temperature of 20° C.-50° C. Here, in particular during the phases P2 with an elevated loading $\varphi_2$ of the laden gas stream $G_1$, it is possible that a quantity of the sorbable substance in the gas-cooling device 30 is thereby separated out in a condensed state. The cooled gas stream $G_3$ may therefore already have a loading $\varphi'_2$ which is reduced in relation to the loading $\varphi_2$ of the laden gas stream $G_1$. The cooled gas stream $G_3$ is then fed to the sorption buffer device 40. The sorption buffer device 40 of the exemplary embodiment is configured in such a way that it is suitable for accommodating five regions $B_1$-$B_5$ with elevated loading of the sorbent 44 (see FIG. 5). Otherwise, the sorption buffer device 40 functions as explained above on the basis of FIG. 3.

Downstream of the sorption buffer device 40, the treated gas stream $G_4$ is fed to a pressure reducer 50, which reduces the pressure of the gas to 15 bar. The gas stream $G_5$ expanded in this manner in particular has a dew point which is below a temperature of the gas pipeline 60, by means of which the expanded gas stream $G_5$ is transported for example to a further industrial plant (not shown). Consequently, condensation of the sorbable substance in the gas pipeline 60 is effectively prevented and negative effects, such as for example corrosion of the gas pipeline 60, are reduced.

Figure 5:
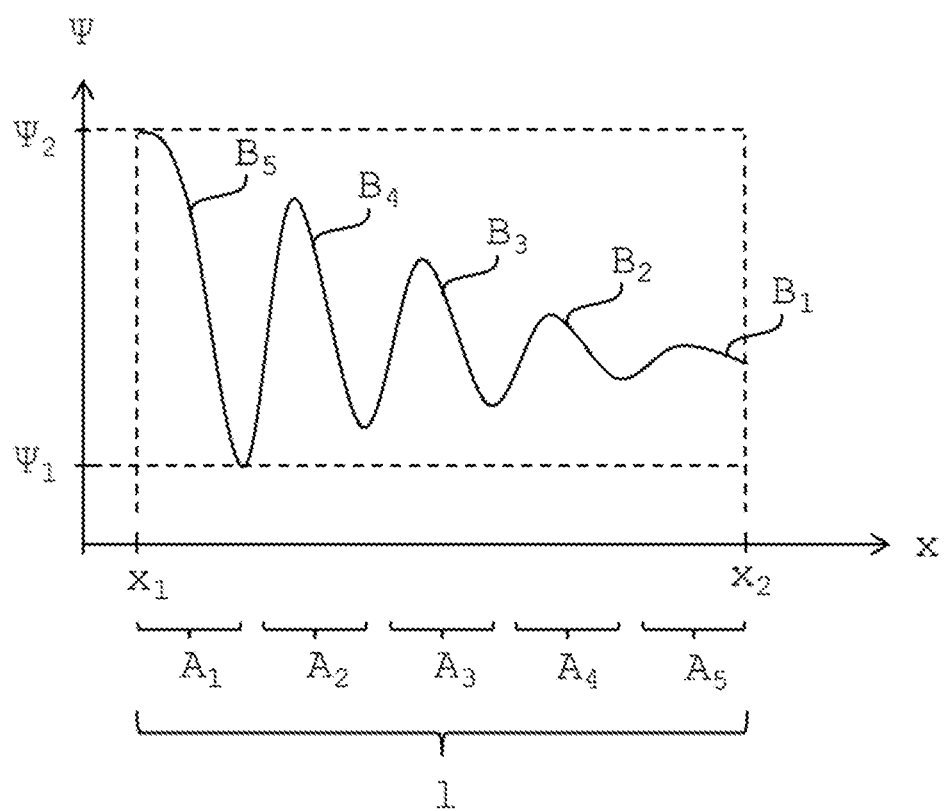
FIG. 5 shows a diagram of one example of a loading of a sorbent in the sorption buffer device with a sorbable substance at one time.

FIG. 5 shows a diagram of one example of a loading front of a sorbent 44 in a sorption buffer device 40 as can be used for example in one of the industrial plants 100, 200. Here, the loading front is illustrated at one time. In the example in FIG. 5, the sorption buffer device 40 is set up for accommodating a total of five regions $B_1$-$B_5$ with an elevated loading ψ of the sorbent 44. The five regions $B_1$-$B_5$ are situated in different sections $A_1$-$A_5$ along the sorption path 45 (see FIG. 4), and each have a relative maximum of the loading ψ of the sorbent 44. The illustrated time in FIG. 5 corresponds to a time after at least five cycles have elapsed, wherein one cycle comprises a sequence of one phase P1 with one following phase P2, for example according to FIG. 2.

Figure 6:
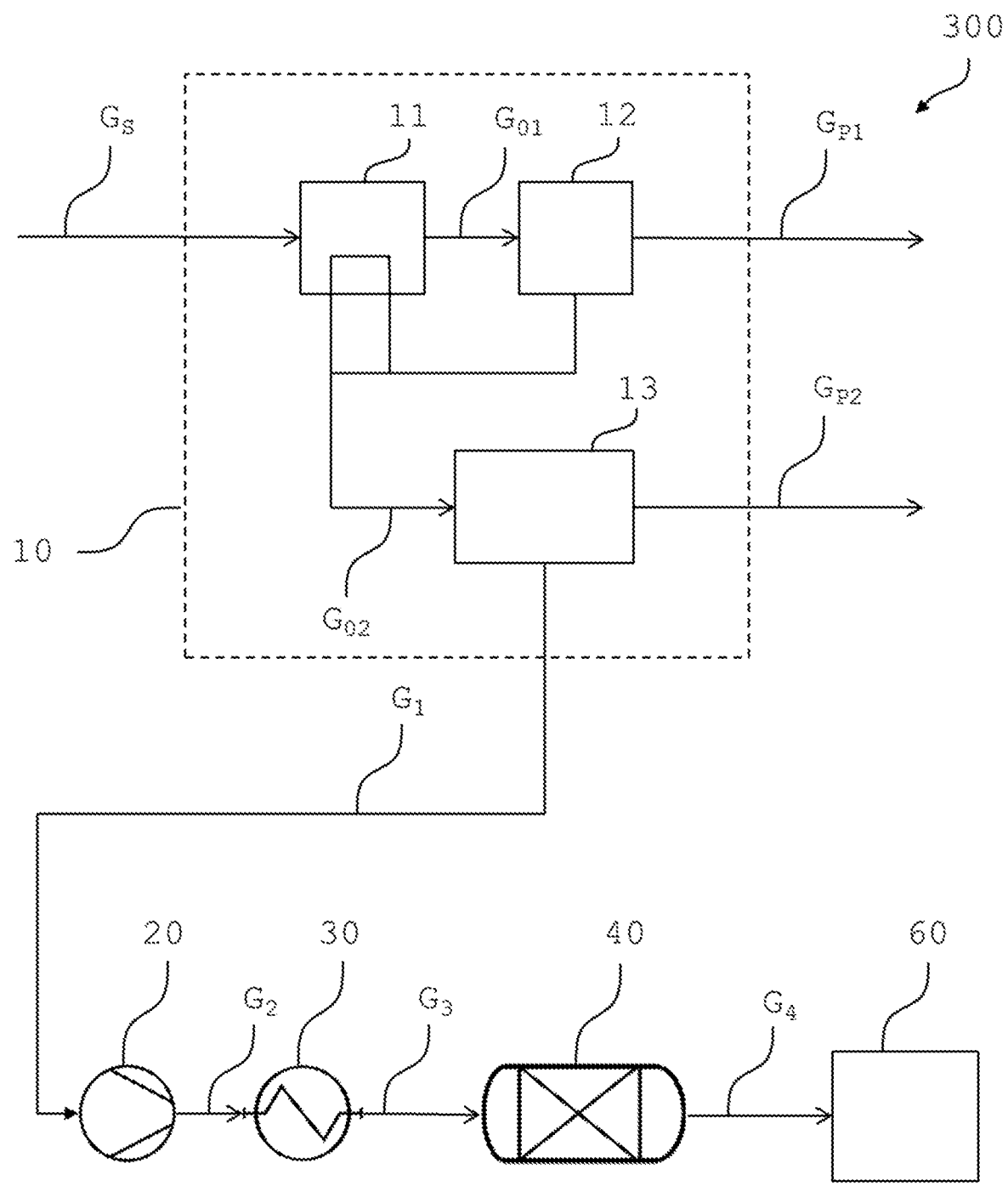
FIG. 6 shows a P & I diagram of a third exemplary embodiment of an industrial plant which is suitable for the implementation of the method.

FIG. 6 shows a P & I diagram of a third exemplary embodiment of an industrial plant 300 which is suitable for the implementation of the method. The industrial plant 300 is designed in particular for the separation of a synthesis gas stream $G_S$ with provision of a first product $G_{P1}$, which largely comprises CO, and a second product $G_{P2}$, which largely comprises $H_2$. In the exemplary embodiment, the adsorption device 10 is formed from a temperature-change adsorption device 11, a cold chamber 12 and a pressure-change adsorption device 13. The industrial plant 300 also has a compressor 20, a gas-cooling device 30, a sorption buffer device 40 and a gas pipeline 60.

The synthesis gas stream $G_S$ firstly flows into the temperature-change adsorption device 11 and, there, is transformed into a gas stream $G_{O1}$ which chiefly comprises CO and $H_2$. The further constituents of the synthesis gas stream $G_S$ are retained in the temperature-change adsorption device 11. The gas stream $G_{O1}$ is fed to the cold chamber 12, in which $H_2$ is separated from CO. In the cold chamber 12, CO accumulates as product $G_{P1}$ and may be used in further processes (not shown). The gas stream $G_{O2}$ chiefly comprises $H_2$. As shown in the diagram, said gas stream $G_{O2}$ is used in phases for the regeneration of the temperature-change adsorption device 11. An elevated loading φ of the gas stream $G_1$ occurs in particular during said regeneration. In the example of the profile over time in FIG. 2, this corresponds to the phase P2. The gas stream $G_{O2}$ is fed to the pressure-change adsorption device 13. There, in particular, $H_2$ is separated from the gas stream $G_{O2}$ and provided as product $G_{P2}$.

The residual gas stream forms the laden gas stream $G_1$, which flows through the further components of compressor 20, gas-cooling device 30 and sorption buffer device 40 and is finally introduced into a gas pipeline 60. Here, in each of these devices, the gas stream is transformed into a gas stream with changed state variables, for example as is described in the exemplary embodiment of the industrial plant 200 according to FIG. 4. The gas stream $G_1$-$G_4$ is suitable for example for combustion in a power plant (not shown).

Figure 7:
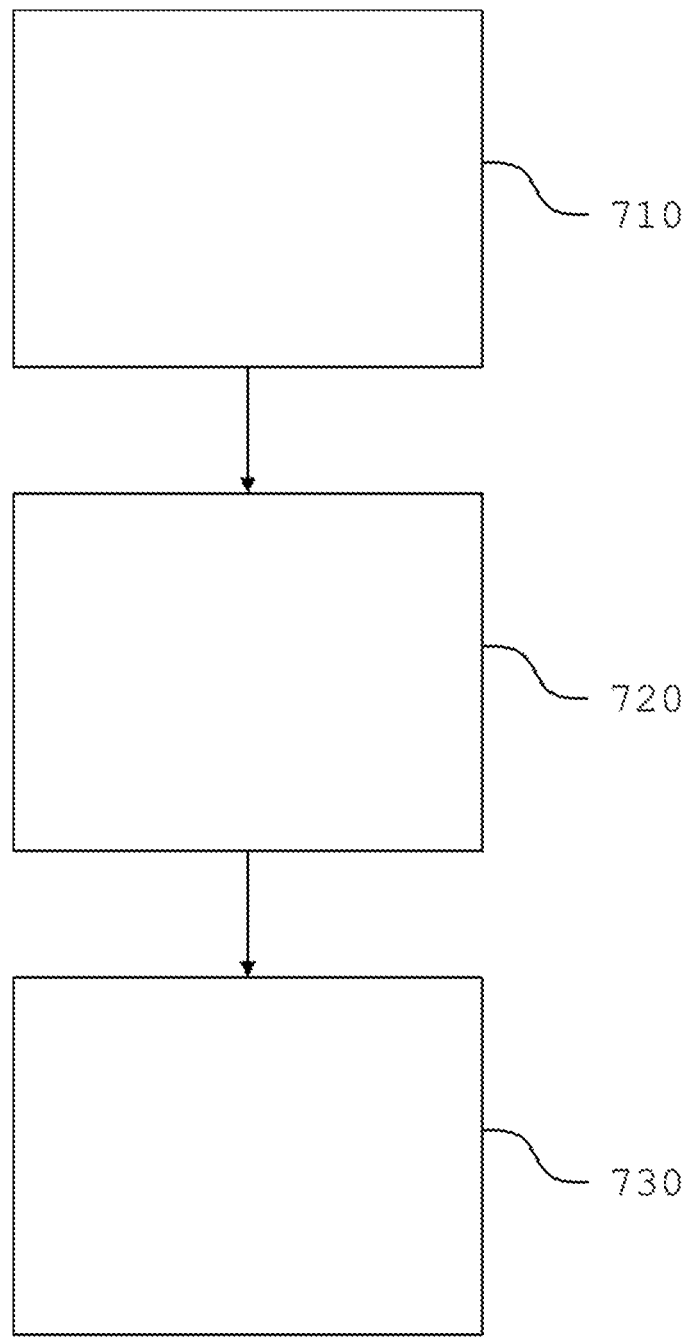
FIG. 7 shows a flow diagram for an exemplary embodiment of a method for operating an industrial plant.

FIG. 7 shows a block diagram of a first exemplary embodiment of a method for operating an industrial plant, for example the industrial plant 100 of the exemplary embodiment in FIG. 1. The illustrated method comprises the steps of:

feeding 710 of a laden gas stream $G_1$ to a sorption buffer device 40. The gas stream $G_1$ is in this case provided by an adsorption device 10. The feeding 710 can mean that the laden gas stream $G_1$ is conducted from the adsorption installation 10 to an inlet 42 of the sorption buffer device 40 by means of a pipeline.

conducting 720 of the laden gas stream $G_1$ in the sorption buffer device 40 through a sorbent 44 along a sorption path 45. Here, it is in particular the case that, by means of sorption, a change in the loading φ of the gas stream $G_1$ and in the loading of the sorbent 44 can take place in individual sections along the sorption path 45. Formed in particular is a loading front with multiple regions $B_1$-$B_5$ with elevated loading of the sorbent 44, which front is shifted along the sorption path 45 in dependence on the loading φ of the laden gas stream $G_1$ and the mass flow rate of the laden gas stream $G_1$. Here, the individual regions $B_1$-$B_5$ are characterized by local maxima in the loading ψ of the sorbent 44 and are separated from one another by local minima in the loading ψ. In the course of the shifting of the individual regions $B_1$-$B_5$, the loading ψ of the sorbent 45 is made more homogenous in such a way that an amplitude, which can be determined for example by a difference in the loading ψ of the sorbent 44 at a local maximum from that at an adjacent local minimum, decreases along the sorption path 45.

tapping off 730 of the treated gas stream $G_4$ at an outlet 43 of the sorption buffer device 40. Tapping off 730 consists in particular of introduction into a pipeline, connected to the outlet 43, in order to feed the treated gas stream $G_4$ to further processes.

FIG. 8 shows a block diagram of a second exemplary embodiment of a method for operating an industrial plant, for example one of the industrial plants 100, 200, 300 of the exemplary embodiments in FIGS. 1, 4 and 6. The method of this exemplary embodiment comprises the same method steps 710, 720, 730 as the preceding exemplary embodiment (see FIG. 7), wherein various method substeps are associated with the individual method steps.

Accordingly, the feeding 710 comprises passing through 711 of an adsorption device 10 by a synthesis gas stream $G_S$ for the purpose of providing a laden gas stream $G_1$. Compression 712 of the laden gas stream $G_1$ for the purpose of providing a gas stream $G_2$ subjected to a pressure follows. Furthermore, the compressed gas stream $G_2$ undergoes cooling 713 for the purpose of providing a cooled gas stream $G_3$. The cooled gas stream $G_3$ is then fed to the inlet 42 of the sorption buffer device 40.

The method step of the conducting 720 of the gas stream comprises at least the substeps of selection 721 of a length of a sorption path 45, and of a quantity of a sorbent 44, in the sorption buffer device 40 in such a way that the latter is suitable for accommodating at least three, preferably four, more preferably five, different regions $B_1$-$B_5$ with elevated loading of the sorbent 44 along the sorption path 45, and of the flowing through 722 of the sorbent 44 along the sorption path 45 by means of the laden gas stream $G_1$ for the purpose of providing a treated gas stream $G_4$ at an outlet 43 of the sorption buffer device 40. The method step of the tapping off 730 comprises in particular expansion 731 of the treated gas stream $G_4$ for the purpose of providing an expanded gas stream $G_5$, and feeding 732 of the expanded gas stream $G_5$ to a gas pipeline 60 for the purpose of transporting the expanded gas stream $G_5$ to a further device or industrial plant.

REFERENCE SIGNS USED

100 Industrial plant
200 Industrial plant
300 Industrial plant
10 Adsorption device
11 Temperature-change adsorption device
12 Cold chamber
13 Pressure-change adsorption device
20 Compressor
30 Gas-cooling device
40 Sorption buffer device
41 Container
42 Inlet 43 Outlet
44 Sorbent
45 Sorption path
50 Pressure reducer
60 Gas pipeline
710 Method step (feeding)
711 Method step (conducting through adsorption device)
712 Method step (compression)
713 Method step (cooling)
720 Method step (conducting)
721 Method step (selection)
722 Method step (flowing through)
730 Method step (tapping off)
731 Method step (expansion)
732 Method step (feeding to a gas pipeline)
$A_1$ Section
$A_2$ Section
$A_3$ Section
$A_4$ Section
$A_5$ Section
$B_1$ Region with elevated loading of the sorbent
$B_2$ Region with elevated loading of the sorbent
$B_3$ Region with elevated loading of the sorbent
$B_4$ Region with elevated loading of the sorbent
$B_5$ Region with elevated loading of the sorbent
G Gas stream in the sorption buffer device
$G_{O1}$ Gas stream for feeding into the cold chamber
$G_{O2}$ Gas stream for feeding into the pressure-change adsorption device
$G_1$ Laden gas stream
$G_2$ Compressed gas stream
$G_3$ Cooled gas stream
$G_4$ Treated gas stream
$G_5$ Expanded gas stream
$G_{P1}$ Product 1
$G_{P2}$ Product 2
$G_S$ Synthesis gas stream
l Length of the sorption path
P1 Phase
P2 Phase
t Time
$t_1$ Time
$t_2$ Time
$t_3$ Time
$t_4$ Time
$t_5$ Time
x Position
$x_1$ Position (inlet)
$x_2$ Position (outlet)
$\varphi$ Loading of the gas stream
$\varphi_1$ Reduced loading of the laden gas stream
$\varphi_2$ Elevated loading of the laden gas stream
$\varphi'_1$ Reduced loading of the treated gas stream
$\varphi'_2$ Elevated loading of the treated gas stream
$\psi$ Loading of the sorbent
$\psi_1$ Maximum loading of the sorbent
$\psi_2$ Minimum loading of the sorbent

The invention claimed is:

1. A method for operating an industrial plant (100) having an adsorption device (10) which emits a gas stream ($G_1$) laden with a sorbable substance with a predefined mass flow rate,
wherein phases (P1) of reduced loading ($\varphi_1$) and phases (P2) of elevated loading ($\varphi_2$), which follow one another in a temporally alternating manner, are involved for the laden gas stream ($G_1$), said method comprising:
feeding (710) the laden gas stream ($G_1$) to an inlet (42) of a sorption buffer device (40);
conducting (720) the laden gas stream ($G_1$) in the sorption buffer device (40) through a sorbent (44), which is suitable for receiving a loading ($\psi$) of the sorbable substance, along a sorption path (45), which leads from the inlet (42) to an outlet (43) of the sorption buffer device (40), wherein the sorbable substance passes from the gas stream to the sorbent (44), or from the sorbent (44) to the gas stream, in dependence on the loading of the gas stream ($\varphi$) and the loading of the sorbent ($\psi$); and
withdrawing (730) a treated gas stream ($G_4$) at the outlet (43) of the sorption buffer device (40);
wherein, during a phase (P2) of elevated loading ($\varphi_2$) of the gas stream ($G_1$) with the sorbable substance, a region ($B_1$) with an elevated loading ($\psi$) of the sorbent (44) with the sorbable substance, which region extends from the inlet (42) of the sorption buffer device (40) along the sorption path (45), is formed, and, during a subsequent phase (P1) of reduced loading ($\varphi_1$) of the gas stream ($G_1$), the region with the elevated loading ($\psi$) of the sorbent (44) is shifted along the sorption path (45) in the direction toward the outlet (43) of the sorbent buffer device (40), and
wherein a length (l) of the sorption path (45) and a quantity of the sorbent (44) in the sorption buffer device (40) are selected (721) in such a way that the sorption buffer device (40) is set up for accommodating at least three different regions ($B_1$-$B_5$) of elevated loading ($\psi$) of the sorbent (44) along the sorption path (45) during the operation of the industrial plant (100).

2. The method as claimed in claim 1, further comprising:
expanding (731) the treated gas stream ($G_4$) with the aid of a pressure reducer (50) arranged in the outflow direction with respect to the sorption buffer device (40), wherein an expanded gas stream ($G_5$) is produced; and
feeding (732) the expanded gas stream ($G_5$) to a gas pipeline (60) arranged downstream of the sorption buffer device (40).

3. The method as claimed in claim 2, wherein a gas pressure difference between the sorption buffer device (40) and the gas pipeline (60) is 5 bar-10 bar.

4. The method as claimed in claim 1, further comprising:
cooling (713) the laden gas stream ($G_1$) with the aid of a gas-cooling device (30) arranged upstream of the sorption buffer device (40), wherein a cooled gas stream ($G_3$) is produced.

5. The method as claimed in claim 4, wherein the temperature of the cooled gas stream ($G_3$) is 20° C.-50° C.

6. The method as claimed in claim 1, further comprising compressing (712) the laden gas stream ($G_1$) with the aid of a compressor (20), wherein a pressurized gas stream ($G_2$) is produced.

7. The method as claimed in claim 6, wherein the pressure of the pressurized gas stream ($G_2$) is 20-30 bar.

8. The method as claimed in claim 1, wherein the adsorption device (10) comprises a temperature-change adsorption device (11), a pressure-change adsorption device (12), or both.

9. The method as claimed in claim 1, wherein the laden gas stream ($G_1$) comprise(s) gaseous hydrogen, gaseous carbon monoxide, gaseous carbon dioxide, gaseous organic compounds, gaseous water, gaseous nitrogen, gaseous oxygen, a gaseous noble gas, or combinations of these.

10. The method as claimed in claim 9, wherein the laden gas stream ($G_1$) has a water quantity of 0-4000 ppm by mole, and the treated gas stream ($G_4$) has a water quantity of 500-2000 ppm by mole.

11. The method as claimed in claim 1, wherein the phase (P2) of elevated loading ($\varphi_2$) of the laden gas stream ($G_1$) comprises a duration of 2-10 h, and the phase (P1) of reduced loading ($\varphi_1$) of the laden gas stream ($G_1$) lasts at least twice as long as the phase (P2) of elevated loading ($\varphi_2$) of the laden gas stream ($G_1$).

12. The method as claimed in claim 1, wherein the mass flow rate of the laden gas stream ($G_1$) and/or of the treated gas stream ($G_4$) lies between 500 standard m³/h and 20 000 standard m³/h.

13. An industrial plant for the implementation of the method as claimed in claim 1, comprising:
the adsorption device (10) from which the gas stream ($G_1$) laden with a sorbable substance with a predefined mass flow rate is emitted, and the sorption buffer device (40) to which the laden gas stream ($G_1$) is fed to the inlet (42) thereof;
wherein a length (l) of a sorption path (45) and a quantity of a sorbent (44) in the sorption buffer device (40) are set up in such a way that the sorption buffer device (40) is suitable for accommodating the at least three different regions ($B_1$-$B_5$) of elevated loading ($\psi$) of the sorbent (44) along the sorption path (45) during the operation of the industrial plant (100).

14. The industrial plant as claimed in claim 13, wherein the laden gas stream ($G_1$) is treated in such a way that the treated gas stream ($G_4$) has a reduced loading ($\varphi'_2$) in relation to the elevated loading ($\varphi_2$) of the laden gas stream ($G_1$) and the treated gas stream ($G_4$) has an elevated loading ($\varphi'_1$) in relation to the reduced loading ($\varphi_1$) of the laden gas stream ($G_1$).

15. The method as claimed in claim 1, wherein the treated gas stream ($G_4$) comprise(s) gaseous hydrogen, gaseous carbon monoxide, gaseous carbon dioxide, gaseous organic compounds, gaseous water, gaseous nitrogen, gaseous oxygen, a gaseous noble gas, or combinations of these.

16. The method as claimed in claim 9, wherein the treated gas stream ($G_4$) comprise(s) gaseous hydrogen, gaseous carbon monoxide, gaseous carbon dioxide, gaseous organic compounds, gaseous water, gaseous nitrogen, gaseous oxygen, a gaseous noble gas, or combinations of these.

17. The method as claimed in claim 9, wherein the laden gas stream ($G_1$) has a water quantity of 0-4,000 ppm by mole, and the treated gas stream ($G_4$) has a water quantity of 750-1,500 ppm by mole.

18. The method as claimed in claim 1, wherein the phase (P2) of elevated loading ($\varphi_2$) of the laden gas stream ($G_1$) comprises a duration of 2-10 h, and the phase (P1) of reduced loading ($\varphi_1$) of the laden gas stream ($G_1$) lasts at least three times as long as the phase (P2) of elevated loading ($\varphi_2$) of the laden gas stream ($G_1$).

19. The method as claimed in claim 1, wherein the mass flow rate of the laden gas stream ($G_1$) and/or of the treated gas stream ($G_4$) lies between 8,000 standard m³/h and 17,000 standard m³/h.

20. The method as claimed in claim 1, wherein the length (l) of the sorption path (45) and a quantity of the sorbent (44) in the sorption buffer device (40) are selected (721) in such a way that the sorption buffer device (40) is set up for accommodating at least four different regions ($B_1$-$B_5$) of elevated loading ($\psi$) of the sorbent (44) along the sorption path (45) during the operation of the industrial plant (100).

21. The method as claimed in claim 1, wherein the length (l) of the sorption path (45) and a quantity of the sorbent (44) in the sorption buffer device (40) are selected (721) in such a way that the sorption buffer device (40) is set up for accommodating at least five different regions ($B_1$-$B_5$) of elevated loading ($\psi$) of the sorbent (44) along the sorption path (45) during the operation of the industrial plant (100).

22. The industrial plant as claimed in claim 13, wherein the length (l) of the sorption path (45) and the quantity of a sorbent (44) in the sorption buffer device (40) are set up in such a way that the sorption buffer device (40) is suitable for accommodating at least four different regions ($B_1$-$B_5$) of elevated loading ($\psi$) of the sorbent (44) along the sorption path (45) during the operation of the industrial plant (100).

23. The industrial plant as claimed in claim 13, wherein the length (l) of the sorption path (45) and the quantity of a sorbent (44) in the sorption buffer device (40) are set up in such a way that the sorption buffer device (40) is suitable for accommodating at least five different regions ($B_1$-$B_5$) of elevated loading ($\psi$) of the sorbent (44) along the sorption path (45) during the operation of the industrial plant (100).

\* \* \* \* \*